United States Patent
Carrel

(10) Patent No.: US 7,088,737 B1
(45) Date of Patent: Aug. 8, 2006

(54) METHOD AND APPARATUS FOR COMBINING PACKETS HAVING DIFFERENT PROTOCOL ENCAPSULATIONS WITHIN A CIRCUIT

(75) Inventor: David Carrel, San Francisco, CA (US)

(73) Assignee: Redback Networks Inc., San Jose, CA (US)

( * ) Notice: Subject to any disclaimer, the term of this patent is extended or adjusted under 35 U.S.C. 154(b) by 810 days.

(21) Appl. No.: 09/698,314

(22) Filed: Oct. 27, 2000

(51) Int. Cl.
H04J 3/22 (2006.01)
H04L 12/56 (2006.01)
H04J 3/16 (2006.01)

(52) U.S. Cl. .................. 370/469; 370/389; 370/474
(58) Field of Classification Search ............... 370/465, 370/466, 469, 471, 473, 474, 230, 231
See application file for complete search history.

(56) References Cited

U.S. PATENT DOCUMENTS

| | | | |
|---|---|---|---|
| 4,667,324 A | 5/1987 | Graves | |
| 4,736,363 A | 4/1988 | Aubin et al. | |
| 5,159,595 A | 10/1992 | Flanagan et al. | |
| 5,608,733 A | 3/1997 | Vallee et al. | |
| 6,205,142 B1 | 3/2001 | Vallee | |
| 6,424,657 B1 * | 7/2002 | Voit et al. | 370/412 |
| 6,578,084 B1 * | 6/2003 | Moberg et al. | 709/236 |
| 6,614,809 B1 * | 9/2003 | Verma et al. | 370/469 |
| 6,618,397 B1 * | 9/2003 | Huang | 370/474 |
| 6,658,021 B1 * | 12/2003 | Bromley et al. | 370/466 |
| 6,662,254 B1 * | 12/2003 | Tal et al. | 710/300 |
| 6,711,162 B1 * | 3/2004 | Ortega et al. | 370/389 |
| 6,775,271 B1 * | 8/2004 | Johnson et al. | 370/352 |
| 6,778,525 B1 * | 8/2004 | Baum et al. | 370/351 |
| 6,850,531 B1 * | 2/2005 | Rao et al. | 370/401 |
| 6,973,097 B1 * | 12/2005 | Donzis et al. | 370/470 |
| 2001/0030977 A1 * | 10/2001 | May | 370/475 |
| 2002/0010782 A1 * | 1/2002 | Hoebeke et al. | 709/227 |

(Continued)

OTHER PUBLICATIONS

Differences Between SLIP and PPP, http://www.ccsi.com/survival-kit/slip-vs-ppp.html, 2 pages, Oct. 19, 2000.

(Continued)

Primary Examiner—Steven Nguyen
Assistant Examiner—Clemence Han
(74) Attorney, Agent, or Firm—Blakely Sokoloff Taylor & Zafman LLP

(57) ABSTRACT

A method and apparatus for combining data packets having different protocol encapsulations within a circuit is described. In one embodiment, a method includes receiving a number of Internet Protocol (IP) packets over Ethernet on a real circuit. Each IP packet over Ethernet has an Ethernet header and an IP address. The method also includes removing the Ethernet header from the number of IP packets. Moreover, a number IP packets within a Point-to-Point Protocol (PPP) over Ethernet are received on at least one virtual circuit. Each of the number of IP packets within the PPP over Ethernet includes a PPP header, a PPP over Ethernet (PPPoE) header, an Ethernet header and an IP address. Additionally, the at least one virtual circuit runs within the real circuit. The method also includes removing the PPP header and the PPPoE header from the number of IP packets within the PPP over Ethernet and removing the Ethernet header from the number of IP packets within the PPP over Ethernet. The number of IP packets over Ethernet and the number of IP packets within PPP over Ethernet are forwarded based on the IP address.

28 Claims, 6 Drawing Sheets

U.S. PATENT DOCUMENTS

| | | | |
|---|---|---|---|
| 2002/0019875 A1* | 2/2002 | Garrett et al. | 709/230 |
| 2002/0097728 A1* | 7/2002 | Hinderks et al. | 370/395.52 |
| 2002/0147826 A1* | 10/2002 | Sultan | 709/230 |
| 2003/0154297 A1* | 8/2003 | Suzuki et al. | 709/229 |
| 2003/0210697 A1* | 11/2003 | Mercier | 370/395.1 |

OTHER PUBLICATIONS

PPP, Tech Encyclopedia, http://www.techweb.com/encyclopedia/defineterm?term=PPP, 2 pages, Oct. 19, 2000.

PPP—Webopedia Definition and Links, http://webopedia.internet.com/TERM/P/PPP.html, 2 pages, Oct. 19, 2000.

2. What is PPP? http://cs.uni-bonn.de/ppp/part2.html, 4 pages, Oct. 19, 2000.

3. How To (configuration recipes), PPP Configuration Recipes, http://cs.uni-bonn.de/ppp/part3.html, 8 pages, Oct. 19, 2000.

4. Misc. PPP questions with answers, PPP Questions and Answers, http://cs.uni-bonn.de/ppp/part4.html, 4 pages, Oct. 19, 2000.

P.K. JHA, "Bandwidth Maximization for SONET/SDH and Direct Data over Optical Networks," http://www.isoc.org/inet2000/cdproceedings/1g/1g_3.htm, pp. 1-26, Nov. 16, 2000.

Redback Networks, Inc., *Access Operating System (AOS) Configuration Guide* Release 2.3, Copyright 1998-1999, 7 pgs.

Redback Networks, Inc., *Release Notice for Redback AOS* Release 3.1.4, Apr. 2000, Copyright 2000, 5 pgs.

Redback Networks, Inc., *Access Operating System (AOS) Configuration Guide* Release 3.1, Copyright 1999, 15 pgs.

Redback Networks, Inc., *Access Operating System (AOS) Command Reference*, Copyright 1999, 21 pgs.

Mamakos, et al., PPP Over Ethernet 'PPPOE', "Draft-Carrel-Info-PPPOE-00.txt", Internet-Draft, Aug. 1998, 11 pgs. http://bgp.potaroo.net/ietf/all-ids/draft-carrel-info-pppoe-oo.txt.

Mamakos, et al. "2.3.12 PPP Over Ethernet (PPPOE) BOF", Current Meeting Report, Aug. 25, 1998. http://www.ietf.org/proceedings/98aug/98aug-71.htm.

* cited by examiner

METHOD AND APPARATUS FOR COMBINING PACKETS HAVING DIFFERENT PROTOCOL ENCAPSULATIONS WITHIN A CIRCUIT

FIELD OF THE INVENTION

The invention relates to the field of telecommunications. More specifically, the invention relates to a method and apparatus for combining packets having different protocol encapsulations within a circuit.

BACKGROUND OF THE INVENTION

With the advent of the Internet and the World Wide Web (WWW), the need for connectivity to and across different networks has become increasingly important. This increased need for connectivity translates into a need for a number of different network elements for the passing of the data traffic. These network elements can include routers, cables, hubs, relays, switches, etc., to carry communications between and among different networks. An increasing number of network elements have been deployed to support increasing network traffic; however, advancements in network technology have also been necessary to support the explosion in network traffic.

Such network elements assume multiple tasks such as terminating network connections, switching, routing and access functions. These network elements have been developed to support the vast and growing number of subscribers communicating across networks and across the Internet. Network elements have advanced from serving hundreds to serving thousands of subscribers, and now to hundreds of thousands of subscribers. Moreover, these network elements are configured to support a variety of communication protocols employed by the multitude of subscribers. Examples of these supported communication protocols may include Asynchronous Transfer Mode (ATM) and Frame Relay. In addition, data transmitted by these network elements can be in stacks of protocols. For example, a subscriber may send data that is a Point-to-Point Protocol over Ethernet, which is over ATM. Accordingly, the circuits connecting to a network element is configured for the type of traffic that is being transmitted.

Moreover, such a need for network connectivity is no longer limited to a business setting. In particular, residential consumers are not only wanting connectivity for computing devices in their homes but also connectivity that allows for higher speed data transmission. The current array of choices for residential consumers is continuing to increase. For example, connectivity can include lower-speed connections at different rates, such as 56 kilobits/second, by employing a Plain Old Telephone Service (POTS) line from the residence. Other choices for connection, which are at higher speeds, into the Internet can include Integrated Services Digital Network (ISDN), Digital Subscriber Line (DSL) service, both over a POTS line, and cable modem service over a RF cable line.

Current networking capabilities are limited in how the data is transmitted through such connections. Typically, residential homes connect to the Internet through a network element using Internet Protocol (IP) packets that are encapsulated in Ethernet and/or Asynchronous Transfer Mode (ATM) for the transmission of data between the residential home and the network element connecting into the Internet. However, some residential homes can also connect to the Internet through a network element using IP packets that are encapsulated in a Point-to-Point Protocol (PPP), Ethernet and/or ATM for the transmission of data between the residential home and the Internet. The employment of Point-to-Point Protocol (PPP) over Ethernet (PPPoE) for the transmission of IP packets allows the network elements connected to the residential homes to associate a given computer within and among different homes that are communicating on a single line into the network elements with the different IP packets being received. In particular, the PPPoE protocol includes identification of the source of the data being transmitted into a network element. However, not all computing devices in residential homes incorporate the PPPoE protocol into their communication with network elements connected thereto. In particular, certain software on such computing devices have not incorporated the functionality to handle the PPPoE encapsulation of the IP packets.

SUMMARY OF THE INVENTION

A method and apparatus for combining data packets having different protocol encapsulations within a circuit are described. In one embodiment, a method includes receiving a number of data packets on a real circuit and a number of virtual circuits. The number of virtual circuits are within the real circuit. Additionally, the number of data packets on the real circuit have a first protocol encapsulation, and the number of data packets on the number of virtual circuits have a second protocol encapsulation. The method also includes deencapsulating the number of data packets having the first protocol encapsulation. Moreover, the number of data packets having the second protocol encapsulation are deencapsulated. The method also includes forwarding the number of data packets having the first protocol encapsulation and the second protocol encapsulation based on an address stored in the number of data packets.

Additionally, in an embodiment, a method includes receiving a number of Internet Protocol (IP) packets over Ethernet on a real circuit. Each IP packet over Ethernet has an Ethernet header and an IP address. The method also includes removing the Ethernet header from the number of IP packets. Moreover, a number of IP packets within a Point-to-Point Protocol (PPP) over Ethernet are received on at least one virtual circuit. Each of the number of IP packets within the PPP over Ethernet includes a PPP header, an Ethernet header and an IP address. Additionally, the at least one virtual circuit runs within the real circuit. The method also includes removing the PPP header from the number of IP packets within the PPP over Ethernet and removing the Ethernet header from the number of IP packets within the PPP over Ethernet. The number of IP packets over Ethernet and the number of IP packets within PPP over Ethernet are forwarded based on the IP address.

Moreover, in one embodiment, a network element includes a number of input/output (I/O) cards coupled to a number of real circuits. Each of the number of real circuits may include at least one virtual circuit. Additionally, the number of line cards receive a number of Internet Protocol (IP) packets over Ethernet on the real circuit and receive a number of IP packets within a Point-to-Point Protocol (PPP) over Ethernet session. The network element also includes a forwarding card having an IP address table. The forwarding card receives the number of IP packets from the number of I/O cards and forwards the IP packets based on the IP address table.

BRIEF DESCRIPTION OF THE DRAWINGS

Embodiments of the invention may be best understood by referring to the following description and accompanying drawings which illustrate such embodiments. In the drawings.

DETAILED DESCRIPTION

A method and apparatus for combining data packets having different protocol encapsulations within a circuit are described. In the following description, for purposes of explanation, numerous specific details are set forth in order to provide a thorough understanding of the present invention. It will be evident, however, to one skilled in the art that the present invention may be practiced without these specific details.

Figure 1:
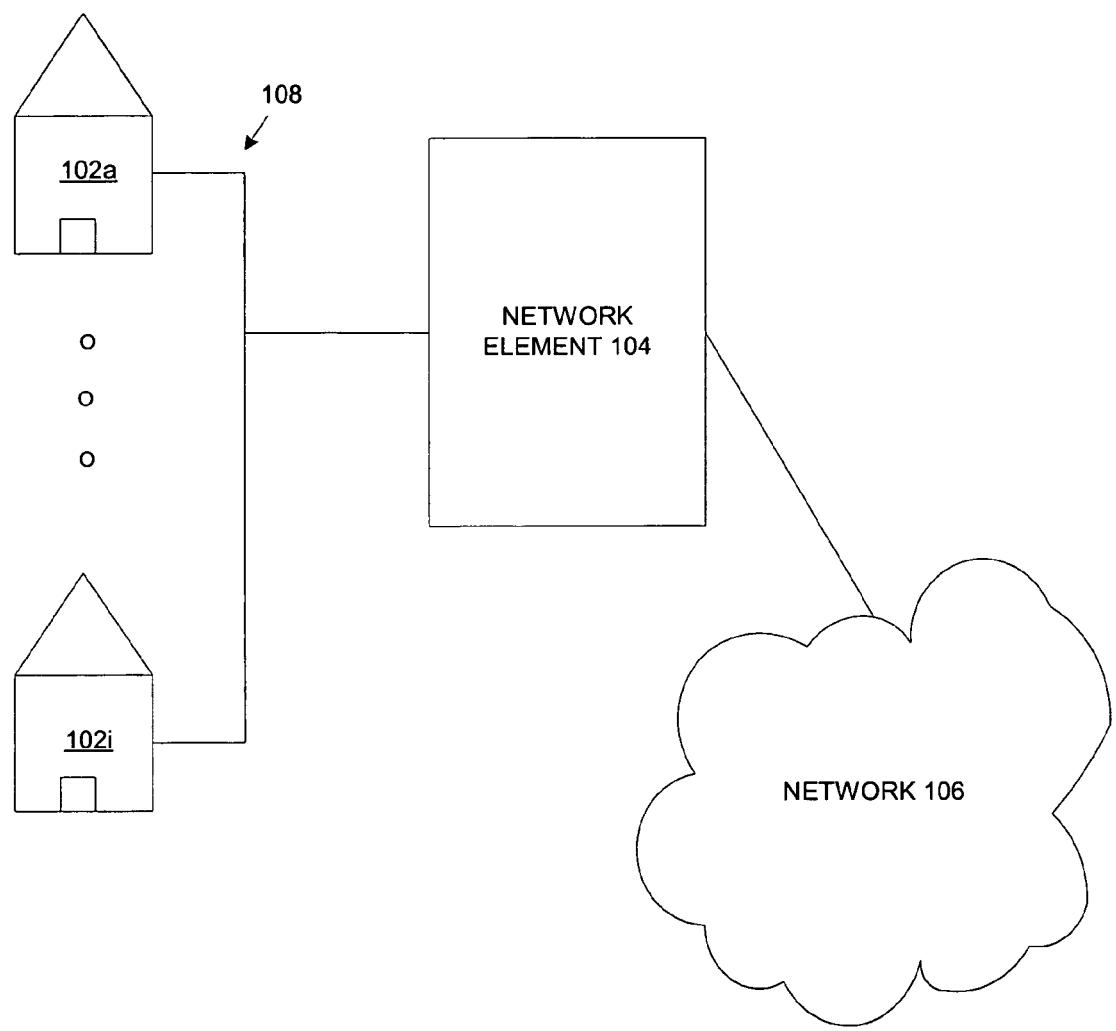
FIG. 1 is block diagram illustrating a system that incorporates embodiments of the present invention.

FIG. 1 is block diagram illustrating a system that incorporates embodiments of the present invention. FIG. 1 includes residential homes 102a–i, physical transmission line 108, network element 104 and network 106. Residential homes 102a–i can include one to any number of homes. Moreover, as shown, residential homes 102a–i are coupled to network element 104 through physical transmission line 108. In an embodiment, residential homes 102a–i can include one to a number of computing devices, such as desktop computer, notebook computer, Personal Digital Assistants (PDAs), that are coupled to physical transmission line 108.

In one embodiment, network 106 is a local area network (LAN). In another embodiment, network 106 is a wide area network (WAN). In one such embodiment, network 106 is the Internet. Further, network 106 can be a combination of different networks that provide communication between different network elements and/or other computing devices, such as a client computer, coupled thereto.

In an embodiment, physical transmission line 108 is defined as a real circuit. In the description herein, the term "real circuit" is described in terms of a physical transmission line. However, embodiments of the present invention are not so limited. For example, a real circuit could include a permanent virtual circuit, as is known in the art. FIG. 1 only shows one physical transmission line coming into network element 104. However, this is for the sake of clarity and not by way of limitation, as a number of different physical transmission lines can be coupled into network element 104. Additionally, each of this different physical transmission lines can be coupled to one to a number of different computing devices from a number of different residential homes into network element 104. Further, FIG. 1 illustrates a single physical transmission line connecting a number of homes into network element 104. However, embodiments of the present invention are not so limited. In particular, in an embodiment, a physical transmission line can couple one house to network element 104.

In an embodiment, physical transmission line 108 could be a Plain Old Telephone Service (POTS) line. In one such embodiment, physical transmission line 108 could be a Digital Subscriber Line (DSL). In another embodiment, physical transmission line 108 could be a cable line transmitting the data packets over an RF cable signal. The above-described embodiments of physical transmission line 108 are by way of example and not by way of limitation, as any other type of physical line capable of carrying data packets can be incorporated into embodiments of the present invention. For example, physical transmission line 108 could be a fiber optics cable carrying the data traffic over an optical signal.

Additionally, as shown, FIG. 1 includes residential homes 102a–i coupled to network element 104. However, embodiments of the present invention are not so limited, as any other type of building that includes one to a number of computing devices, as described herein, can be incorporated into embodiments of the present invention. For example, computing devices of businesses can be coupled to network element 104.

Figure 2:
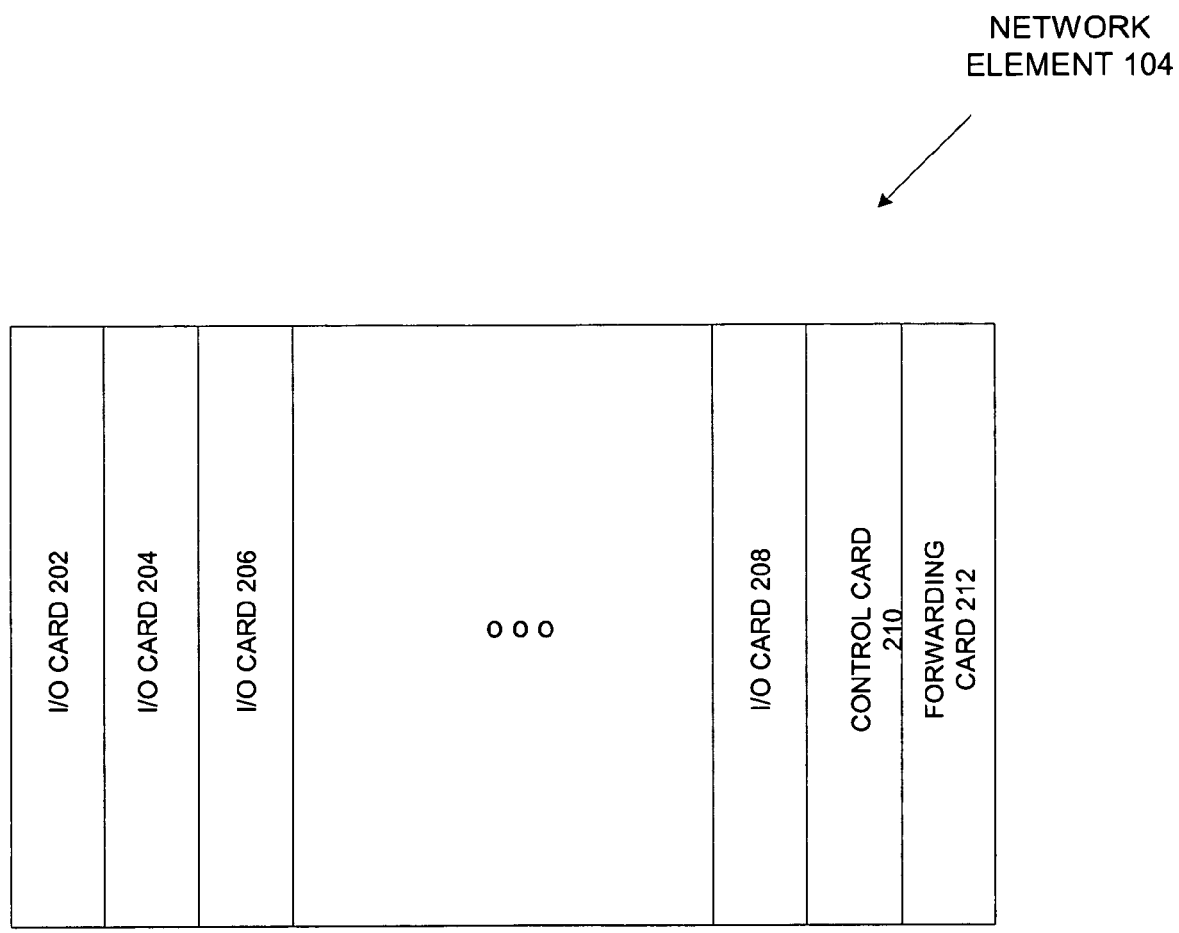
FIG. 2 illustrates a block diagram of network element 104, according to embodiments of the present invention.

FIG. 2 illustrates a block diagram of network element 104, according to embodiments of the present invention. As shown, network element 104 includes input/output (I/O) cards 202–208. Network element 104 is not limited to the number of I/O cards shown in FIG. 2, as network element 104 can include any of a number of different I/O cards. Network element 104 also includes control card 210 and forwarding card 212.

In an embodiment, each of I/O cards 202–208, control card 210 and forwarding card 212 can include a processor and memory. Each of I/O cards 202–208, control card 210 and forwarding card 212 are coupled to system buses. Control card 210 performs control, system configuration and management tasks for network element 104. For example, if forwarding card 212 needs to be updated with a new Internet Protocol (IP) address table, such data is received by control card 210 and transmitted to forwarding card 212.

Moreover, forwarding card 212 provides for buffering, packet processing and forwarding of data packets being received by I/O cards 202–208. In particular, I/O 202–208 cards can be coupled to a number of data transmission lines, such as physical transmission line 108 of FIG. 1, which are coupled to other network elements and/or computing devices, as shown in FIG. 1. Accordingly, I/O cards 202–208 receive and transmit data traffic from and to data transmission lines coupled thereto. Such data traffic is transmitted to forwarding card 212, where this traffic can be buffered, processed and/or forwarded to other I/O cards within network element 104, as will be described in more detail below.

The embodiment of network element 104 is by way of example and not by way of limitation, as network elements having other architectural configurations can incorporate embodiments of the present invention. Examples of other network elements that include incorporate embodiments of the present invention could have multiple forwarding cards or have a single line card incorporating the functionality of both the forwarding and the controlling. Moreover, a network element having the forwarding functionality distributed across the I/O cards could incorporate embodiments of the present invention.

Figure 3:
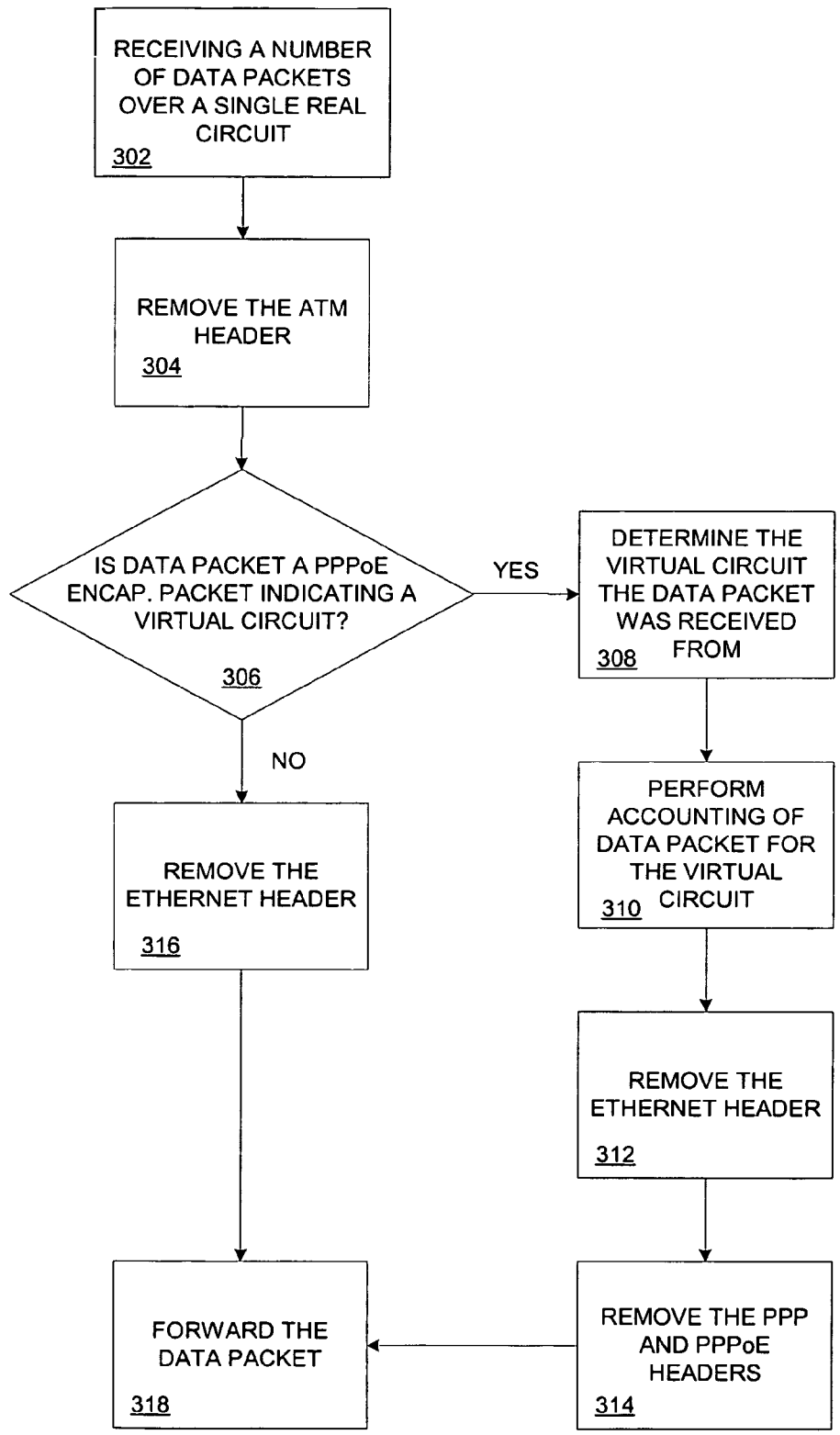
FIG. 3 is a flowchart illustrating a method of processing data packets of differing protocols on a single real circuit, according to embodiments of the present invention.

Embodiments of operation of network element 104 will now be described in conjunction with FIG. 3. In particular, FIG. 3 is a flowchart illustrating a method of processing data packets of differing protocols on a single real circuit, according to embodiments of the present invention. Method 300 of FIG. 3 is described in terms of a single physical transmission line coupled to I/O card 202. Operations of method 300 are applicable to any I/O card within network element 104, which is coupled to a physical transmission line.

Figure 4:
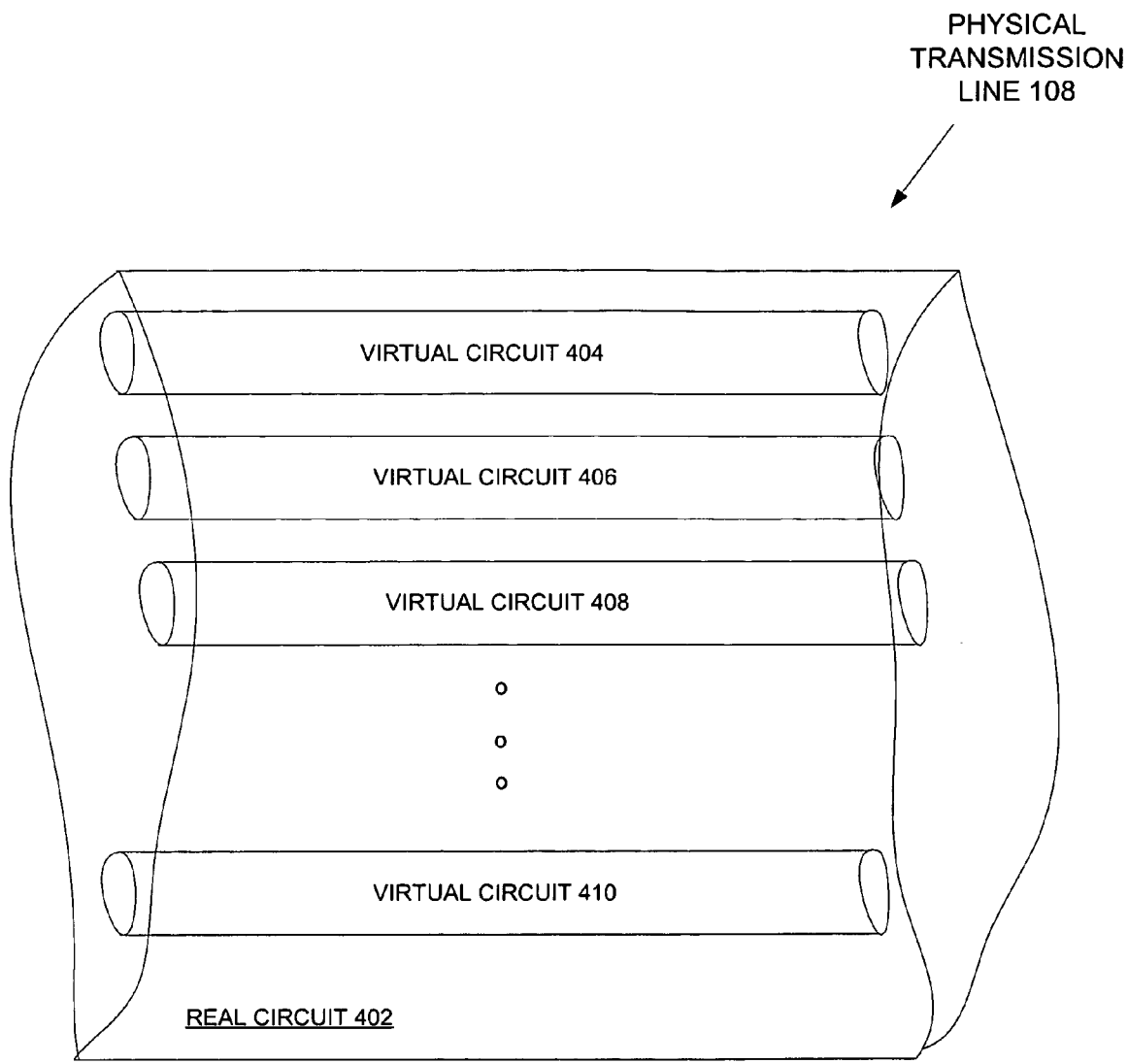
FIG. 4 illustrates a more detail diagram of physical transmission line 108 that includes a number of virtual circuits, according to embodiments of the present invention.

Method 300 of FIG. 3 commences with the receipt of a number of data packets over physical transmission line 108 by I/O card 202, at process block 302. In an embodiment, the data packets are based on different protocols. In one such embodiment, the data packets are based on two different protocols, such that a first protocol is transmitted on physical transmission line 108 (i.e., the real circuit), while a second set of data packets based on a second protocol is transmitted on a number of virtual circuits within the real circuit. In particular, FIG. 4 illustrates a more detail diagram of physical transmission line 108 that includes a number of virtual circuits, according to embodiments of the present invention. Physical transmission line 108 acts as real circuit 402. Additionally, physical transmission line 108 includes virtual circuits 404–410. The number of virtual circuit illustrated in FIG. 4 are by way of example and not by way of limitation, as physical transmission line 108 can include a lesser or greater number of virtual circuits. In one embodiment, the number of virtual circuits that can be included in physical transmission line 108 is 65,535.

In one embodiment, a virtual circuit is created upon the initiation by a computing device coupled to physical transmission line 108. In particular, such a computing device executes a software application that initiates and negotiates a PPPoE session with network element 104. Accordingly, upon receiving this initiation request, network element 104 establishes the PPPoE session and creates the virtual circuit. Accordingly, each data packet received and transmitted from this computing device during this PPPoE session includes a PPPoE session identification to enable network element 104 to associate a given data packet with the particular PPPoE session, thereby creating a virtual circuit between this computing device and network element 104.

Figure 5A:
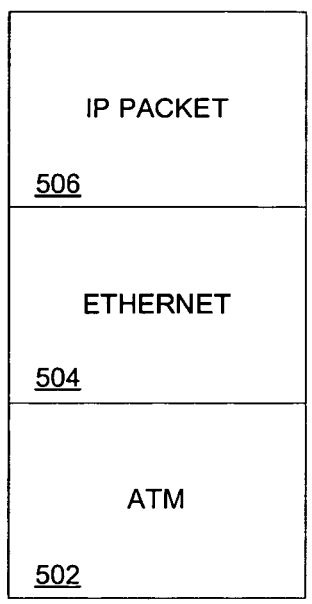
FIGS. 5a–5b are block diagrams illustrating one embodiment of the different protocol encapsulations of a data packet using different protocols, according to embodiments of the present invention.
Figure 5B:
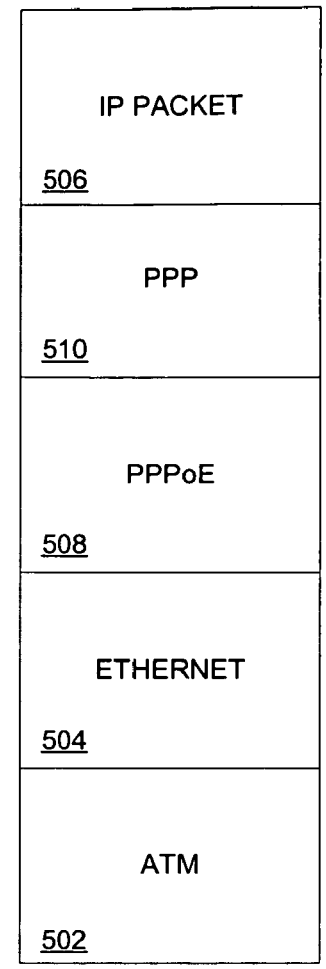

FIGS. 5a–5b are block diagrams illustrating one embodiment of the different protocol encapsulations of a data packet using different protocols, according to embodiments of the present invention. FIGS. 5a–5b illustrate a protocol encapsulation wherein the given data packet is an IP packet, which is shown as block 506. Additionally, FIG. 5a illustrates the encapsulation of IP packet 506 within Ethernet layer 504, which is termed IP over Ethernet (IPoE). As shown, IP packet 506 can be further encapsulated within ATM layer 502. FIG. 5b illustrates the encapsulation of IP packet 506 within PPP layer 508 and PPPoE layer 510. Further, IP packet 506 is encapsulated within Ethernet layer 504, which is termed PPP over Ethernet (PPPoE). As shown, IP packet 506 can be further encapsulated within ATM layer 502.

The protocol encapsulation illustrated in FIGS. 5a–5b are by way of example and not by way of limitation, as other types of data packets employing other types of protocols can used within embodiments of the present invention. For example, in an embodiment, the data packets can be encapsulated within a Frame Relay protocol layer, instead of the ATM protocol layer.

In one embodiment, real circuit 402 (i.e., physical transmission line 108) transmits IP packets over Ethernet. In one such embodiment, these IP packets are further encapsulated within an ATM protocol layer, as illustrated by FIG. 5a. In an embodiment, virtual circuits 404–410 are transmitting IP packets within PPP over Ethernet. In one such embodiment, these IP packets are further encapsulated within an ATM protocol layer, as illustrated by FIG. 5b.

Moreover, in an embodiment, a given virtual circuit is associated with a given PPPoE session between a computing device and network element 104. Returning to FIG. 1, one to a number of computing devices can be included in each of residential homes 102a–i, such that these computing devices can be coupled to network element 104 through a PPPoE session, thereby transmitting the IP packets using the encapsulation illustrated by FIG. 5b. In one embodiment, a given virtual circuit is generated upon the creation of a PPPoE session between a given computing device and network element 104, as described above.

The encapsulation of IP packets within PPPoE enables network element 104 to associate a given PPPoE session on a given computing device with a set of data traffic being sent. Accordingly, network element 104 can perform a finer grain of accounting such that network element 104 is able to determine how many given IP packets are being received from and transmitted to network element 104 for a given PPPoE session for a given computing device. In turn, network element 104 could limit the data rate for a given computing device or other type of policing of the data bandwidth of physical transmission line 108 based on the tracking of these PPPoE sessions.

Conversely, a number of these computing devices may not have the functionality to communicate to network element 104 using PPPoE because of the software running thereon. Accordingly, such computing devices can be coupled to network element 104 such that data traffic sent between the computing devices and network element 104 are employing IPoE, thereby transmitting the IP packets using the encapsulation illustrated by FIG. 5a. Therefore, embodiments of the present invention allow for PPPoE and IPoE over a single real circuit by employing virtual circuits within the real circuit for the transmission of PPPoE data traffic.

Returning to method 300 of FIG. 3, upon receipt of a given data packet, I/O card 202 of network element 104 removes the ATM header from the data packet, at process block 304. In other words the IP packet is deencapsulated from the ATM protocol layer. Additionally, I/O card 202 determines whether the data packet is an IP packet encapsulated within PPP over Ethernet transmitted over a virtual circuit located within real circuit 402, at process decision block 306. In an embodiment, I/O card 202 determines whether the data packet is an IP packet encapsulated within PPP over Ethernet based on the Ethernet header. In particular, the Ethernet header includes data that identifies what the Ethernet layer is encapsulating.

Upon determining that the data packet is an IP packet encapsulated within PPP over Ethernet transmitted over a virtual circuit, I/O card 202 determines which of virtual circuits 404–410 that data packet was received from, at process block 308. In an embodiment, I/O card 202 determines which of virtual circuits 404–410 that the data packet was received from based on the Ethernet header and/or the PPP header. In particular, the Ethernet header and the PPPoE header can include data that identifies the virtual circuit that data packet was received from.

Additionally, I/O card 202 can perform accounting of the data packet, at process block 310. In an embodiment, I/O card 202 calculates the number of data packets that are received on a given virtual circuit. Accordingly, I/O card 202 can limit the amount of traffic that can be transmitted on a given virtual circuit. Additionally, such accounting enables I/O card 202 to perform sanity and/or security checking to ensure that the data being received is accurate. I/O card 202 also removes the Ethernet header from the data packet, at process block 312. Moreover, I/O card 202 removes the PPPoE header and PPP header from the data packet, at process block 314. In other words the IP packet is deencapsulated from the Ethernet and PPP protocol layers.

This IP packet is then forwarded to forwarding card 212 of network element 104. Accordingly, forwarding card 212 forwards the IP packet to one of I/O cards 202–208 based on the IP address contained in the IP packet, at process block 318. In an embodiment, forwarding card 212 includes an IP address table, which serves as a translation for the IP address. In particular, this IP address table associates a given IP address with one of the ports of one of I/O cards 202–208, as different ports are coupled to other network elements within network 106 and/or other computing devices coupled to physical transmission line 108.

Upon determining that the data packet is not IP packet over PPP over Ethernet on a virtual circuit, I/O card 202 removes the Ethernet header from the IP packet, at process block 316. I/O card 202 then forwards the IP packet to one of I/O cards 202–208 based on the IP address contained in the IP packet, at process block 318, as described above.

Method 300 is described in terms of an ATM protocol layer encapsulating IP packet within the Ethernet protocol layer. However, embodiments of the present invention are not so limited, as the IP packet could be just encapsulated within the Ethernet protocol layer. For example, the computing device and network element 104 could be coupled together to receive Ethernet-based IP packets, independent of an additional protocol layer.

Figure 6:
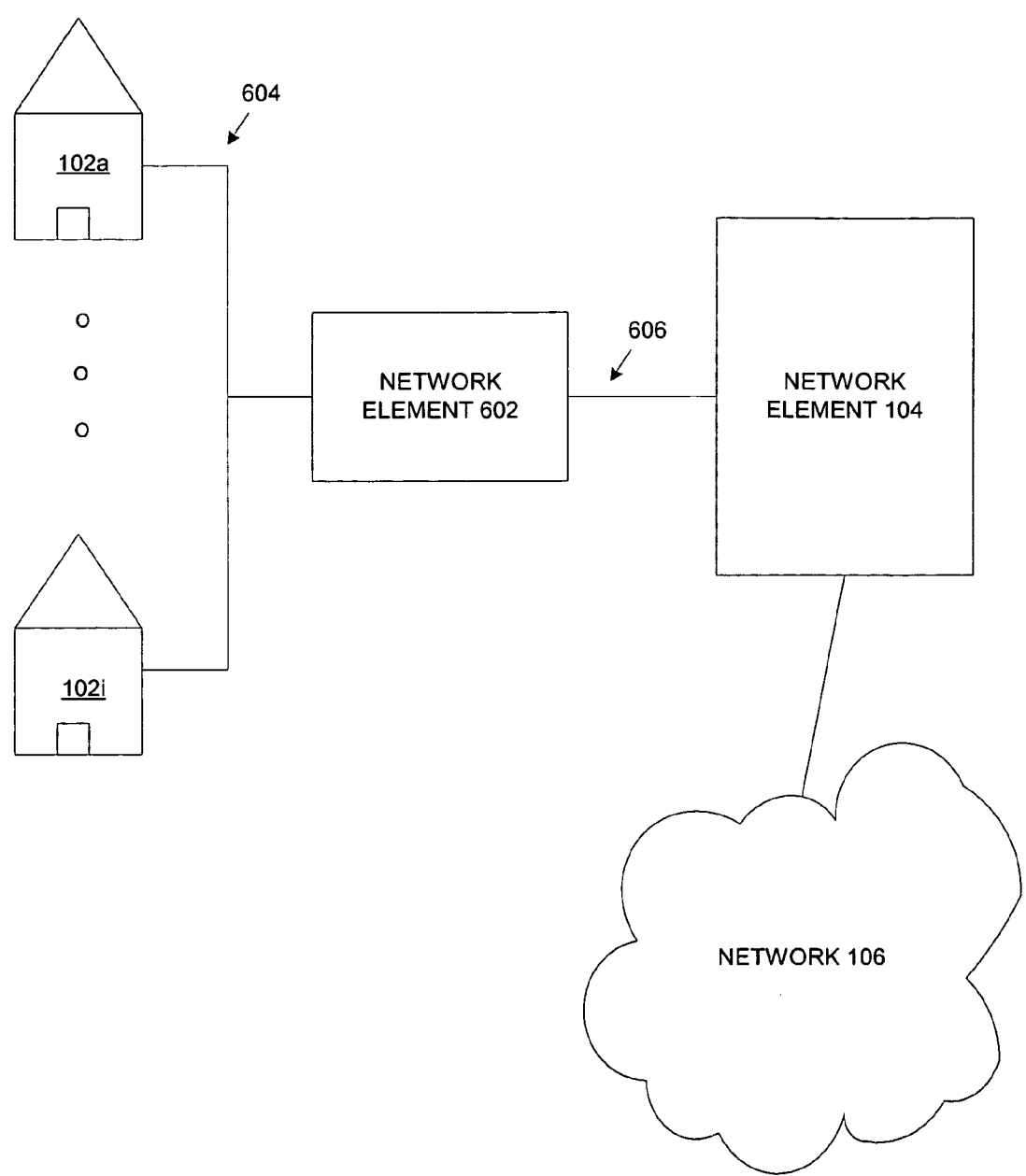
FIG. 6 is block diagram illustrating another system embodiment that incorporates embodiments of the present invention.

Moreover, embodiments of the present invention are not limited to the network and system configuration illustrated in FIG. 1. In particular, FIG. 6 is block diagram illustrating another system embodiment that incorporates embodiments of the present invention. As shown, in addition to the elements described above in conjunction with the system of FIG. 1, FIG. 6 includes network element 602 that is located between residential houses 102a–i and network element 104. Physical transmission line 604, which is similar to physical transmission line 108, couples residential houses 102a–i to network element 602. Further, network element 602 is coupled to network element 104 through physical transmission line 606. In an embodiment, physical transmission line 606 is an Ethernet-based line. In operation, the different IP packets from the real circuit and virtual circuits within physical transmission line 604 are transmitted to network element 602. Network element 602 then transports these data packets within the real circuit and the virtual circuits through physical transmission line 606, as described above.

Additionally, embodiments of the present invention could be incorporated into other network configurations wherein network element 104 is communicating with another network element, such that the communication is Ethernet-based. An example of such a network element could be an Ethernet bridge. Moreover, embodiments of the present invention can incorporate other types of IP packets into the virtual circuits within a given real circuit. In one such embodiment, the virtual circuits are based on the Ethernet hardware address of a given computing device and not an IP packet that is encapsulated within PPP over Ethernet. In another embodiment, the virtual circuits could be based on the source IP address of the given IP packet. Accordingly, embodiments of the present invention can be incorporated into different system wherein network element 104 is able to receive a first type of data traffic on the real circuit and a second type of data traffic on a number of virtual circuits within the real circuit.

Moreover as described above, I/O cards 202–208, control card 210 and forwarding card 212 include both a processor and memory. Such memory includes a machine-readable medium on which is stored a set of instructions (i.e., software) embodying any one, or all, of the methodologies described herein. Software can reside, completely or at least partially, within such memory and/or within the processor. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for combining data packets having different protocol encapsulations within a circuit have been described. Although the present invention has been described with reference to specific exemplary embodiments, it will be evident that various modifications and changes may be made to these embodiments without departing from the broader spirit and scope of the invention. For example, embodiments of the present invention could provide for additional protocol encapsulation layers during the transmission of data packets. Accordingly, the specification and drawings are to be regarded in an illustrative rather than a restrictive sense.

What is claimed is:

1. A method comprising:
concurrently receiving a number of streams of Internet Protocol (IP) packets from a physical medium on which is currently configured a real circuit and a number of virtual circuits, wherein the number of virtual circuits are within the real circuit such that the number of Internet Protocol (IP) packets on the real circuit have an IP over Ethernet encapsulation and the number of Internet Protocol (IP) packets on the number of virtual circuits have a Point-to-Point Protocol over Ethernet encapsulation;
deencapsulating the number of Internet Protocol (IP) packets having the IP over Ethernet encapsulation;
deencapsulating the number of Internet Protocol (IP) packets having the Point-to-Point Protocol over Ethernet encapsulation; and
forwarding the number of Internet Protocol (IP) packets having the IP over Ethernet encapsulation and the Point-to-Point Protocol over Ethernet encapsulation based on an address stored in the number of Internet Protocol (IP) packets.

2. A method comprising:
receiving a number of Internet Protocol (IP) packets over Ethernet on a real circuit from a physical medium on which is currently configured the real circuit and at least one virtual circuit, each IP packet over Ethernet having an Ethernet header and an IP address;
removing the Ethernet header from the number of IP packets;
receiving a number of IP packets within a Point-to-Point Protocol (PPP) over Ethernet on the at least one virtual circuit concurrently with the receiving the IP packets over Ethernet, wherein each of the number of IP packets within the PPP over Ethernet includes a PPP header, a PPP over Ethernet (PPPoE) header, an Ethernet header and an IP address, wherein the at least one virtual circuit runs within the real circuit;

removing the PPP header and the PPPoE header from the number of IP packets within the PPP over Ethernet;

removing the Ethernet header from the number of IP packets within the PPP over Ethernet; and forwarding the number of IP packets over Ethernet and the number of IP packets within PPP over Ethernet based on the IP address.

3. The method of claim 2, wherein the number of IP packets over Ethernet and the number of IP packets within the PPP over Ethernet are encapsulated in an Asynchronous Transfer Mode (ATM) protocol layer.

4. The method of claim 3, further comprising removing the ATM protocol layer from the number of IP packets over Ethernet and the number of IP packets within the PPP over Ethernet.

5. The method of claim 2, further comprising calculating the number of IP packets within the PPP over Ethernet that are being received from the at least one virtual circuit.

6. The method of claim 5, further comprising performing rate limiting on the at least one virtual circuit based on the number of calculated IP packets within the PPP over Ethernet.

7. A method comprising:

concurrently receiving a number of different streams of data packets over Ethernet from a physical medium on which is currently configured both a real circuit and a number of virtual circuits running within the real circuit;

recursively performing the following for each of the number of different data packets:

upon determining that a received data packet is an Internet Protocol (IP) packet over Ethernet on the real circuit, removing an Ethernet header from the received data packet and forwarding the IP packet based on an IP address stored in the IP packet; and upon determining that a received data packet is an IP packet within a Point-to-Point Protocol (PPP) over Ethernet on one of the number of virtual circuits, removing an Ethernet header, a PPP header and a PPP over Ethernet (PPPoE) header from the data packet and forwarding the IP packet based on an IP address stored in the IP packet.

8. The method of claim 7, wherein the number of IP packets over Ethernet and the number of IP packets within the PPP over Ethernet are encapsulated in an Asynchronous Transfer Mode (ATM) protocol layer.

9. The method of claim 8, further comprising removing the ATM protocol layer from the number of IP packets over Ethernet and the number of IP packets within the PPP over Ethernet.

10. The method of claim 7, further comprising calculating the number of IP packets within the PPP over Ethernet that are being received from the at least one virtual circuit.

11. The method of claim 10, further comprising performing rate limiting on the at least one virtual circuit based on the number of calculated IP packets within the PPP over Ethernet.

12. A network element comprising:

a number of input/output (I/O) cards coupled to a number of real circuits, wherein each of the number of real circuits include at least one virtual circuit, the number of I/O cards to receive a number of streams of Internet Protocol (IP) packets over Ethernet having an IP over Ethernet encapsulation on the real circuit on a physical medium on which is currently configured the real circuit and at the least one virtual circuit, to receive a number of IP packets within a Point-to-Point Protocol (PPP) over Ethernet encapsulation on the at least one virtual circuit concurrently with the receiving the IP packets over Ethernet, to deencapsulate the number of Internet Protocol (IP) packets having the IP over Ethernet encapsulation and to deencapsulate the number of Internet Protocol (IP) packets having the Point-to-Point Protocol over Ethernet encapsulation; and a forwarding card having an IP address table, the forwarding card to receive the number of IP packets from the number of I/O cards and to forward the IP packets based on the IP address stored in the IP packet and the IP address table.

13. The network element of claim 12, further comprising a control card having a database of configuration information, the configuration information used to configure the forwarding card and the number of I/O cards.

14. The network element of claim 12, wherein the number of I/O cards to determine the number of IP packets within the PPP over Ethernet that are being received from the at least one virtual circuit.

15. The network element of claim 12, wherein the number of I/O cards to perform rate limiting on the at least one virtual circuit based on the number of calculated IP packets within the PPP over Ethernet.

16. A machine-readable medium that provides instructions which, when executed by a machine, cause said machine to perform operations comprising:

concurrently receiving a number of streams of Internet Protocol (IP) packets from a physical medium on which is currently configured a real circuit and a number of virtual circuits, wherein the number of virtual circuits are within the real circuit such that the number of Internet Protocol (IP) packets on the real circuit having an IP over Ethernet encapsulation and the number of Internet Protocol (IP) packets on the number of virtual circuits having a Point-to-Point Protocol over Ethernet encapsulation;

deencapsulating the number of Internet Protocol (IP) packets having the IP over Ethernet encapsulation;

deencapsulating the number of Internet Protocol (IP) packets having the Point-to-Point Protocol over Ethernet encapsulation; and forwarding the number of Internet Protocol (IP) packets having the IP over Ethernet encapsulation and the Point-to-Point Protocol over Ethernet encapsulation based on an address stored in the number of data packets.

17. A machine-readable medium that provides instructions which, when executed by a machine, cause said machine to perform operations comprising:

receiving a number of Internet Protocol (IP) packets over Ethernet on a real circuit a physical medium on which is currently configured the real circuit and at least one virtual circuit, each IP packet over Ethernet having an Ethernet header and an IP address;

removing the Ethernet header from the number of IP packets;

concurrently with the receiving the IP packets over Ethernet, receiving a number IP packets within a Point-to-Point Protocol (PPP) over Ethernet on at least one virtual circuit, wherein each of the number of IP packets within the PPP over Ethernet includes a PPP header, a PPP over Ethernet (PPPoE) header, an Ethernet header and an IP address, wherein the at least one virtual circuit runs within the real circuit;

removing the PPP header and the PPPoE header from the number of IP packets within the PPP over Ethernet;

removing the Ethernet header from the number of IP packets within the PPP over Ethernet; and forwarding the number of IP packets over Ethernet and the number of IP packets within PPP over Ethernet based on the IP address.

18. The machine-readable medium of claim 17, wherein the number of IP packets over Ethernet and the number of IP packets within the PPP over Ethernet are encapsulated in an Asynchronous Transfer Mode (ATM) protocol layer.

19. The machine-readable medium of claim 18, further comprising removing the ATM protocol layer from the number of IP packets over Ethernet and the number of IP packets within the PPP over Ethernet.

20. The machine-readable medium of claim 17, further comprising calculating the number of IP packets within the PPP over Ethernet that are being received from the at least one virtual circuit.

21. The machine-readable medium of claim 20, further comprising performing rate limiting on the at least one virtual circuit based on the number of calculated IP packets within the PPP over Ethernet.

22. A machine-readable medium that provides instructions which, when executed by a machine, cause said machine to perform operations comprising:

concurrently receiving a number of different streams of data packets over Ethernet from a physical medium on which is currently configured both a real circuit and a number of virtual circuits running within the real circuit;

recursively performing the following for each of the number of different data packets:

upon determining that a received data packet is an Internet Protocol (IP) packet over Ethernet on the real circuit, removing an Ethernet header from the received data packet and forwarding the IP packet based on an IP address stored in the IP packet; and upon determining that a received data packet is an IP packet within a Point-to-Point Protocol (PPP) over Ethernet on one of the number of virtual circuits, removing an Ethernet header, a PPP header and a PPP over Ethernet (PPPoE) header from the data packet and forwarding the IP packet based on an IP address stored in the IP packet.

23. The machine-readable medium of claim 22, wherein the number of IP packets over Ethernet and the number of IP packets within the PPP over Ethernet are encapsulated in an Asynchronous Transfer Mode (ATM) protocol layer.

24. The machine-readable medium of claim 23, further comprising removing the ATM protocol layer from the number of IP packets over Ethernet and the number of IP packets within the PPP over Ethernet.

25. The machine-readable medium of claim 22, further comprising calculating the number of IP packets within the PPP over Ethernet that are being received from the at least one virtual circuit.

26. The machine-readable medium of claim 25, further comprising performing rate limiting on the at least one virtual circuit based on the number of calculated IP packets within the PPP over Ethernet.

27. A system comprising:

a physical transmission line; and a network element coupled to the physical transmission line configured to, concurrently receive a number of streams of Internet Protocol (IP) packets from a physical medium on which is currently configured a real circuit and a number of virtual circuits, wherein the real circuit is within the physical transmission line, the number of virtual circuits are within the real circuit such that the number of Internet Protocol (IP) packets on the real circuit have an IP over Ethernet encapsulation, and the number of Internet Protocol (IP) packets on the number of virtual circuits have a Point-to-Point Protocol over Ethernet encapsulation;

deencapsulate the number of Internet Protocol (IP) packets having the IP over Ethernet encapsulation;

deencapsulate the number of Internet Protocol (IP) packets having the Point-to-Point Protocol over Ethernet encapsulation; and forwarding the each of the deencapsulated Internet Protocol (IP) packets based on an IP address stored in it.

28. The system of claim 27, wherein the physical transmission line is one of a plurality of digital subscriber lines (DSL) coupled to the network element.

* * * * *